US012042453B2

(12) United States Patent
Audic et al.

(10) Patent No.: US 12,042,453 B2
(45) Date of Patent: Jul. 23, 2024

(54) PATIENT POSITIONING APPARATUS AND MATTRESS

(71) Applicant: HILL-ROM SERVICES, INC., Batesville, IN (US)

(72) Inventors: Mickael Audic, Locmiquelic (FR); Jean-Bernard Duvert, Auray (FR); Philippe Kaikenger, Pluvigner (FR)

(73) Assignee: HILL-ROM SERVICES, INC., Batesville, IN (US)

( * ) Notice: Subject to any disclaimer, the term of this patent is extended or adjusted under 35 U.S.C. 154(b) by 126 days.

(21) Appl. No.: 17/432,298

(22) PCT Filed: Feb. 26, 2020

(86) PCT No.: PCT/IB2020/051639
§ 371 (c)(1),
(2) Date: Aug. 19, 2021

(87) PCT Pub. No.: WO2020/174418
PCT Pub. Date: Sep. 3, 2020

(65) Prior Publication Data

US 2022/0133563 A1 May 5, 2022

(30) Foreign Application Priority Data

Feb. 26, 2019 (EP) .................................... 19159477

(51) Int. Cl.
*A61G 7/057* (2006.01)
*A47C 27/08* (2006.01)
(Continued)

(52) U.S. Cl.
CPC ......... *A61G 7/05776* (2013.01); *A61G 7/001* (2013.01); *A47C 27/08* (2013.01); (Continued)

(58) Field of Classification Search
CPC ................ A61G 7/05776; A61G 7/001; A61G 7/05746; A61G 7/05753; A61G 7/057; (Continued)

(56) References Cited

U.S. PATENT DOCUMENTS 624,638 A 5/1899 Fouknier
1,147,560 A 7/1915 Shurtleff et al.
(Continued)

FOREIGN PATENT DOCUMENTS

CN 105581881 A 5/2016
CN 106955206 7/2017
(Continued)

OTHER PUBLICATIONS

PCT Search Report and Written Opinion prepared for PCT/IB2020/051639, completed May 28, 2020.

*Primary Examiner* — David R Hare
*Assistant Examiner* — Deborah Talitha Gedeon
(74) *Attorney, Agent, or Firm* — Barnes & Thornburg LLP

(57) ABSTRACT

A patient positioning apparatus for use with a mattress has a first lateral tilt bladder and a third lateral tilt bladder underlying a first side of the mattress, and a second lateral tilt bladder and a fourth lateral tilt bladder underlying a second side of the mattress. The tilt bladders are inflatable to alter the position of a patient lying on the mattress, and inflation and/or deflation of the lateral tilt bladders is controllable by a controller. A first check valve allows fluid communication in one direction from the third lateral tilt bladder to the first lateral tilt bladder, and a second check valve allows fluid communication in one direction from the fourth lateral tilt bladder to the second lateral tilt bladder.

14 Claims, 5 Drawing Sheets

(51) Int. Cl.
*A47C 27/10* (2006.01)
*A61G 7/00* (2006.01)

(52) U.S. Cl.
CPC .......... *A47C 27/081* (2013.01); *A47C 27/082* (2013.01); *A47C 27/10* (2013.01); *A61G 7/057* (2013.01); *A61G 7/05746* (2013.01); *A61G 7/05753* (2013.01); *A61G 7/05761* (2013.01); *A61G 7/05769* (2013.01); *A61G 7/05784* (2016.11); *A61G 7/05792* (2016.11); *A61G 2203/10* (2013.01); *A61G 2203/34* (2013.01)

(58) Field of Classification Search
CPC ................ A61G 7/05761; A61G 7/018; A61G 7/05769; A61G 7/05792; A61G 7/05784; A61G 2203/34; A61G 2203/10; A61G 2203/30; A47C 27/08; A47C 27/10; A47C 27/081; A47C 27/082; A47C 27/083; B65D 81/051; B65D 81/052
See application file for complete search history.

(56) References Cited

U.S. PATENT DOCUMENTS 1,468,072 A 9/1923 Ogle
1,772,310 A 8/1930 Hart
2,245,909 A 6/1941 Enfiajian
2,415,150 A 2/1947 Stein
2,437,006 A 3/1948 Simpson
2,460,245 A 1/1949 Summerville
2,491,557 A 12/1949 Goolsbee
2,575,764 A 11/1951 Morner
2,604,641 A 7/1952 Reed
2,719,986 A 10/1955 Rand
2,998,817 A 9/1961 Armstrong
3,148,391 A 9/1964 Whitney
3,192,540 A 7/1965 Swank
3,199,124 A 8/1965 Grant
3,284,815 A 11/1966 Grossman et al.
3,297,023 A 1/1967 Foley
3,303,518 A 2/1967 Ingram
3,317,934 A 5/1967 Hinrichs
3,363,941 A 1/1968 Wierwille
3,390,674 A 7/1968 Jones
3,394,415 A 7/1968 Parker
3,421,163 A 1/1969 Stoughton
3,426,373 A 2/1969 Scott et al.
3,446,203 A 5/1969 Murray
3,462,778 A 8/1969 Whitney
3,467,081 A 9/1969 Glass
3,477,071 A 11/1969 Emerson
3,485,240 A 12/1969 Fountain
3,492,988 A 2/1970 De Mare
3,587,568 A 6/1971 Thomas
3,595,223 A 7/1971 Castagna
3,605,138 A 9/1971 Tucker
3,605,145 A 9/1971 Graebe
3,644,950 A 2/1972 Lindsay, Jr.
3,653,083 A 4/1972 Lapidus
3,667,073 A 6/1972 Renfroe
3,670,347 A 6/1972 Weinstein
3,674,019 A 7/1972 Grant
3,678,520 A 7/1972 Evans
3,701,173 A 10/1972 Whitney
3,740,777 A 6/1973 Dee
3,757,356 A 9/1973 Freeman
3,762,404 A 10/1973 Sakita
3,775,781 A 12/1973 Bruno et al.
3,775,785 A 12/1973 Mittendorf
3,784,994 A 1/1974 Kery
3,795,021 A 3/1974 Moniot
3,822,425 A 7/1974 Scales
3,867,732 A 2/1975 Morrell
3,870,450 A 3/1975 Graebe
3,879,776 A 4/1975 Solen
3,909,858 A 10/1975 Ducker
3,919,730 A 11/1975 Regan
3,935,604 A 2/1976 Collins
3,949,438 A 4/1976 Scales
3,955,563 A 5/1976 Maione
3,978,530 A 9/1976 Amarantos
3,982,786 A 9/1976 Burgin et al.
4,005,236 A 1/1977 Graebe
4,068,334 A 1/1978 Randall
4,094,025 A 6/1978 Nystad
4,099,276 A 7/1978 Hunt et al.
4,132,228 A 1/1979 Green
4,136,413 A 1/1979 Scales
4,149,285 A 4/1979 Stanton
4,175,297 A 11/1979 Richardson et al.
4,185,341 A 1/1980 Scales
4,190,286 A 2/1980 Bentley
4,193,149 A 3/1980 Welch
4,197,837 A 4/1980 Christoffel et al.
4,225,989 A 10/1980 Corbett et al.
4,267,611 A 5/1981 Agulnick
4,279,044 A 7/1981 Douglas
4,280,487 A 7/1981 Jackson
4,347,633 A 9/1982 Gammons et al.
4,391,009 A 7/1983 Schild et al.
4,422,194 A 12/1983 Viesturs et al.
4,428,087 A 1/1984 Horn
4,454,615 A 6/1984 Whitney
4,472,847 A 9/1984 Gammons et al.
4,483,030 A 11/1984 Flick et al.
4,488,322 A 12/1984 Hunt et al.
4,508,107 A 4/1985 Strom et al.
4,517,693 A 5/1985 Viesturs
4,525,885 A 7/1985 Hunt et al.
4,525,886 A 7/1985 Savenije
4,527,298 A 7/1985 Moulton
4,528,704 A 7/1985 Wegener et al.
4,534,078 A 8/1985 Viesturs et al.
4,541,136 A 9/1985 Graebe
4,542,547 A 9/1985 Sato
4,551,874 A 11/1985 Matsumura et al.
4,583,255 A 4/1986 Mogaki et al.
4,594,743 A 6/1986 Owen et al.
4,614,000 A 9/1986 Mayer
4,617,690 A 10/1986 Grebe
4,622,706 A 11/1986 Takeuchi
4,638,516 A 1/1987 Vrzalik
4,638,519 A 1/1987 Hess
4,642,825 A 2/1987 Kurita
4,653,130 A 3/1987 Senoue et al.
4,654,903 A 4/1987 Chubb et al.
4,662,012 A 5/1987 Torbet
4,686,719 A 8/1987 Johnson et al.
4,686,722 A 8/1987 Swart
4,688,283 A 8/1987 Jacobson et al.
4,694,520 A 9/1987 Paul et al.
4,697,290 A 10/1987 Alklind et al.
4,698,864 A 10/1987 Graebe
4,700,418 A 10/1987 Ritter
4,711,275 A 12/1987 Ford et al.
4,722,105 A 2/1988 Douglas
4,729,598 A 3/1988 Hess
4,745,647 A 5/1988 Goodwin
4,768,249 A 9/1988 Goodwin
4,797,962 A 1/1989 Goode
4,798,227 A 1/1989 Goodwin
4,799,276 A 1/1989 Kadish
4,803,744 A 2/1989 Peck et al.
4,825,486 A 5/1989 Kimura et al.
4,838,309 A 6/1989 Goodwin
4,840,425 A 6/1989 Noble
4,841,221 A 6/1989 Barney et al.
4,852,195 A 8/1989 Schulman
4,862,921 A 9/1989 Hess
4,864,671 A 9/1989 Evans
4,896,389 A 1/1990 Chamberland
4,907,308 A 3/1990 Leininger et al.
4,914,760 A 4/1990 Hargest et al.
4,914,771 A 4/1990 Afeyan

(56) References Cited

U.S. PATENT DOCUMENTS 4,935,968 A 6/1990 Hunt et al.
4,941,221 A 7/1990 Kanzler
4,942,635 A 7/1990 Hargest et al.
4,944,060 A 7/1990 Peery et al.
4,949,412 A 8/1990 Goode
4,949,413 A 8/1990 Goodwin
4,949,414 A 8/1990 Thomas et al.
4,953,247 A 9/1990 Hasty
4,962,552 A 10/1990 Hasty
4,967,431 A 11/1990 Hargest et al.
5,003,654 A 4/1991 Vrzalik
5,005,240 A 4/1991 Vrzalik
5,008,965 A 4/1991 Vrzalik
5,022,110 A 6/1991 Stroh
5,029,352 A 7/1991 Hargest et al.
5,035,014 A 7/1991 Blanchard
5,036,559 A 8/1991 Hargest
5,044,029 A 9/1991 Vrzalik
5,051,673 A 9/1991 Goodwin
5,052,067 A 10/1991 Thomas et al.
5,062,167 A 11/1991 Thomas et al.
5,065,464 A 11/1991 Blanchard et al.
5,065,466 A 11/1991 Thomas et al.
5,073,999 A 12/1991 Thomas et al.
5,090,074 A 2/1992 Scales et al.
5,090,077 A 2/1992 Caden et al.
5,092,007 A 3/1992 Hasty
5,095,568 A 3/1992 Thomas et al.
5,103,519 A 4/1992 Hasty
5,111,544 A 5/1992 Graebe
5,121,513 A 6/1992 Thomas et al.
5,138,729 A 8/1992 Ferrand
5,142,719 A 9/1992 Vrzalik
5,152,021 A 10/1992 Vrzalik
5,152,023 A 10/1992 Graebe
5,163,196 A 11/1992 Graebe et al.
5,168,589 A 12/1992 Stroh et al.
5,181,288 A 1/1993 Heaton et al.
5,182,826 A 2/1993 Thomas et al.
5,235,713 A 8/1993 Guthrie et al.
5,249,318 A 10/1993 Loadsman
5,251,349 A 10/1993 Thomas et al.
5,269,030 A 12/1993 Pahno et al.
5,313,679 A 5/1994 Yamaguchi
5,323,500 A 6/1994 Roe et al.
5,345,629 A 9/1994 Ferrand
5,373,595 A 12/1994 Johnson et al.
5,375,273 A 12/1994 Bodine et al.
5,388,292 A 2/1995 Stinson et al.
5,396,671 A 3/1995 Stacy
5,421,044 A 6/1995 Steensen
5,487,196 A 1/1996 Wilkinson et al.
5,526,543 A 6/1996 Dimatteo
5,586,346 A 12/1996 Stacy et al.
5,611,096 A 3/1997 Bartlett et al.
5,664,270 A 9/1997 Bell et al.
5,781,949 A 7/1998 Weismiller et al.
5,794,289 A 8/1998 Wortman et al.
5,802,646 A 9/1998 Stolpmann et al.
5,803,263 A * 9/1998 Pozzo .................. B65D 81/052 383/3
5,815,865 A 10/1998 Washburn et al.
5,926,883 A 7/1999 Rechin et al.
5,934,280 A 8/1999 Viard et al.
5,944,066 A 8/1999 Viard
5,966,763 A 10/1999 Thomas et al.
5,983,428 A 11/1999 Hannagan
5,983,429 A 11/1999 Stacy et al.
6,021,533 A 2/2000 Ellis et al.
6,145,142 A 11/2000 Rechin et al.
6,212,718 B1 4/2001 Stolpmann et al.
6,216,300 B1 4/2001 Hannagan
6,243,894 B1 6/2001 Kosumsuppamala et al.
6,295,675 B1 10/2001 Ellis et al.
6,298,511 B1 10/2001 Collymore
6,421,858 B1 7/2002 Curel
6,467,113 B2 10/2002 Ellis et al.
6,499,167 B1 12/2002 Ellis et al.
6,536,056 B1 3/2003 Vrzalik et al.
6,568,013 B2 5/2003 Perez et al.
6,584,628 B1 7/2003 Kummer et al.
6,622,324 B2 9/2003 Vansteenburg et al.
6,701,558 B2 3/2004 Vansteenburg
6,735,500 B2 5/2004 Nicholas et al.
6,760,939 B2 7/2004 Ellis et al.
6,839,929 B2 1/2005 Stolpmann
6,855,158 B2 2/2005 Stolpmann
6,892,405 B1 5/2005 Dimitriu et al.
6,904,631 B2 6/2005 Vrzalik et al.
7,007,330 B2 3/2006 Kuiper et al.
7,076,818 B2 7/2006 Kummer et al.
7,111,348 B2 9/2006 Ellis et al.
7,296,312 B2 11/2007 Menkedick et al.
7,308,725 B2 12/2007 Cazzini et al.
7,322,947 B2 1/2008 Flick et al.
7,346,945 B2 3/2008 Phillips et al.
7,346,951 B1 3/2008 Heaton
7,353,556 B2 4/2008 Ellis et al.
7,398,573 B2 7/2008 Ellis et al.
7,469,436 B2 12/2008 Meyer et al.
7,596,823 B2 10/2009 Friedrichs
7,681,269 B2 3/2010 Biggie et al.
7,698,765 B2 4/2010 Bobey et al.
7,712,171 B2 5/2010 Butler
7,802,332 B2 9/2010 Kummer et al.
8,429,774 B2 4/2013 Tarsaud et al.
8,601,622 B1 12/2013 Garnero et al.
9,241,581 B2 1/2016 O'Nion
D779,236 S 2/2017 Ribble et al.
9,833,369 B2 12/2017 Meyer et al.
9,913,547 B2 3/2018 Driscoll, Jr. et al.
10,426,277 B2 10/2019 Cerri, III
10,617,581 B2 4/2020 Gibson et al.
11,109,799 B2 9/2021 Ribble et al.
2003/0159219 A1 8/2003 Harrison et al.
2003/0226206 A1 12/2003 Ben-Levi
2005/0166328 A1 8/2005 Ben-Levi
2006/0101581 A1 5/2006 Blanchard et al.
2006/0112489 A1 6/2006 Bobey et al.
2006/0123552 A1 6/2006 Ben-Levi
2007/0143928 A1 6/2007 Biggie et al.
2007/0163052 A1 7/2007 Romano et al.
2008/0028533 A1 2/2008 Stacy et al.
2008/0040860 A1 2/2008 Price et al.
2008/0172789 A1 7/2008 Elliot et al.
2008/0235875 A1 10/2008 Wells
2008/0263763 A1 10/2008 Butler
2008/0271253 A1 11/2008 Pile
2009/0106893 A1 4/2009 Blevins
2009/0106906 A1 4/2009 Soltani et al.
2010/0071137 A1 3/2010 Doehler et al.
2010/0138998 A1 6/2010 Wilkinson et al.
2011/0068928 A1 3/2011 Riley et al.
2011/0163885 A1 7/2011 Poulos et al.
2012/0089419 A1 4/2012 Huster et al.
2012/0198627 A1 8/2012 Turner et al.
2012/0222214 A1 9/2012 Lachenbruch et al.
2012/0311790 A1 12/2012 Nomura et al.
2012/0312196 A1 12/2012 Newkirk
2013/0219622 A1 8/2013 Hornbach et al.
2014/0007353 A1 1/2014 Stryker et al.
2014/0047644 A1 2/2014 Mossbeck
2014/0062342 A1 3/2014 Murphy
2014/0245539 A1 9/2014 Ooba
2014/0259410 A1 9/2014 Zerhusen et al.
2014/0292529 A1 10/2014 Zerhusen
2014/0323816 A1 10/2014 Soderberg et al.
2014/0345060 A1 11/2014 Ribble et al.
2014/0375451 A1 12/2014 Douglas et al.
2015/0136146 A1 5/2015 Hood et al.
2015/0164409 A1 6/2015 Benson et al.
2015/0164720 A1 6/2015 Gibson et al.
2015/0335507 A1* 11/2015 Emmons ................ A61G 7/018 5/691

(56) References Cited

U.S. PATENT DOCUMENTS

| | | | |
|---|---|---|---|
| 2016/0120716 | A1 | 5/2016 | Ribble et al. |
| 2016/0367170 | A1 | 12/2016 | Larson et al. |
| 2017/0245656 | A1 | 8/2017 | Ribble et al. |
| 2017/0333270 | A1 | 11/2017 | Peng et al. |
| 2018/0028376 | A1 | 2/2018 | Heneveld, Jr. et al. |
| 2019/0029900 | A1 | 1/2019 | Walton et al. |
| 2019/0117152 | A1 | 4/2019 | Ribble et al. |
| 2019/0209405 | A1 | 7/2019 | Sayadi et al. |
| 2019/0231624 | A1 | 8/2019 | Lafleche et al. |
| 2020/0100969 | A1 | 4/2020 | Ribble et al. |

FOREIGN PATENT DOCUMENTS

| | | | | | |
|---|---|---|---|---|---|
| CN | 107928239 | A | | 4/2018 | |
| DE | 2249013 | A1 | | 7/1974 | |
| DE | 7522889 | U | | 11/1975 | |
| DE | 2446935 | A1 | | 4/1976 | |
| DE | 7334397 | U | | 9/1976 | |
| DE | 2522863 | A1 | | 11/1976 | |
| DE | 7639097 | U1 | | 7/1977 | |
| DE | 2614861 | A1 | | 10/1977 | |
| DE | 2816642 | A1 | | 10/1978 | |
| DE | 2919438 | A1 | | 11/1980 | |
| DE | 3217981 | A1 | | 11/1982 | |
| DE | 3303615 | A1 | | 8/1984 | |
| DE | 3535374 | A1 | | 4/1987 | |
| DE | 3716263 | A1 | | 11/1988 | |
| DE | 9010880 | U1 | | 2/1991 | |
| DE | 202008002003 | U1 | | 4/2009 | |
| EP | 0034954 | A2 | | 9/1981 | |
| EP | 0122666 | A2 | | 10/1984 | |
| EP | 0134051 | A1 | | 3/1985 | |
| EP | 0162785 | A2 | | 11/1985 | |
| EP | 0168213 | A2 | | 1/1986 | |
| EP | 0228233 | A2 | | 7/1987 | |
| EP | 0261830 | A2 | | 3/1988 | |
| EP | 0275618 | A1 | | 7/1988 | |
| EP | 0296689 | A1 | | 12/1988 | |
| EP | 0302579 | A1 | | 2/1989 | |
| EP | 0311993 | A2 | | 4/1989 | |
| EP | 0338472 | A1 | | 10/1989 | |
| EP | 0676158 | A1 | | 10/1995 | |
| EP | 1056372 | A1 | | 12/2000 | |
| EP | 2494946 | A2 | | 9/2012 | |
| EP | 3015058 | A1 | | 5/2016 | |
| EP | 3207911 | A1 | | 8/2017 | |
| FR | 2998460 | A1 | | 5/2014 | |
| GB | 122806 | A | | 2/1919 | |
| GB | 762528 | A | | 11/1956 | |
| GB | 796746 | A | | 6/1958 | |
| GB | 946831 | A | | 1/1964 | |
| GB | 949652 | A | | 2/1964 | |
| GB | 958651 | A | | 5/1964 | |
| GB | 959103 | A | | 5/1964 | |
| GB | 969367 | A | | 9/1964 | |
| GB | 1023097 | A | | 3/1966 | |
| GB | 1059100 | A | | 2/1967 | |
| GB | 1118740 | A | | 7/1968 | |
| GB | 1126364 | A | | 9/1968 | |
| GB | 1222710 | A | | 2/1971 | |
| GB | 1273342 | A | | 5/1972 | |
| GB | 1286197 | A | | 8/1972 | |
| GB | 1291015 | A | | 9/1972 | |
| GB | 1341325 | A | | 12/1973 | |
| GB | 1398544 | A | | 6/1975 | |
| GB | 1440193 | A | | 6/1976 | |
| GB | 1442994 | A | | 7/1976 | |
| GB | 1474018 | A | | 5/1977 | |
| GB | 1483045 | A | | 8/1977 | |
| GB | 1499938 | A | | 2/1978 | |
| GB | 1545806 | A | | 5/1979 | |
| GB | 2026315 | A | | 2/1980 | |
| GB | 1576641 | A | | 10/1980 | |
| GB | 2059256 | A | | 4/1981 | |
| GB | 1595417 | A | | 8/1981 | |
| GB | 1599422 | A | | 9/1981 | |
| GB | 1601808 | A | | 11/1981 | |
| GB | 1602952 | A | | 11/1981 | |
| GB | 2090734 | A | | 7/1982 | |
| GB | 2107197 | A | | 4/1983 | |
| GB | 2108837 | A | | 5/1983 | |
| GB | 2134382 | A | | 8/1984 | |
| GB | 2141333 | A | | 12/1984 | |
| GB | 2167293 | A | | 5/1986 | |
| GB | 2177594 | A | | 1/1987 | |
| GB | 2177595 | A | | 1/1987 | |
| GB | 2177906 | A | | 2/1987 | |
| GB | 2183471 | A | | 6/1987 | |
| JP | 06080425 | U | | 11/1994 | |
| JP | 11299839 | A | | 11/1999 | |
| JP | 2000189470 | A | | 7/2000 | |
| JP | 2006051212 | A | | 2/2006 | |
| JP | 2017189313 | A | | 10/2017 | |
| JP | 2018015206 | A | | 2/2018 | |
| WO | 8404884 | A1 | | 12/1984 | |
| WO | 8605973 | A1 | | 10/1986 | |
| WO | 8606624 | A1 | | 11/1986 | |
| WO | 8903203 | A1 | | 4/1989 | |
| WO | WO200245656 | | | 6/2002 | |
| WO | WO-03073825 | A2 | * | 9/2003 | ........... A47C 27/082 |
| WO | 2004089270 | A1 | | 10/2004 | |
| WO | 2011006093 | A1 | | 1/2011 | |
| WO | 2013166003 | A1 | | 11/2013 | |
| WO | WO-2013166003 | A1 | * | 11/2013 | ............. A61G 7/001 |

* cited by examiner

PATIENT POSITIONING APPARATUS AND MATTRESS

CROSS-REFERENCE TO RELATED APPLICATIONS

This application is the U.S. national phase of PCT/IB2020/051639, filed on Feb. 26, 2020, which claims the benefit of European Patent Application Number 19159477.9, filed on Feb. 26, 2019, the entire disclosures of both of which are hereby incorporated by reference herein.

TECHNICAL FIELD

The present invention relates to a patient positioning apparatus for use with a mattress, and a mattress. In particular, the invention relates to a patient positioning apparatus comprising inflatable bladders which may be inflated to alter the lateral position of a patient in order to control pressure distribution and provide rotation therapies.

BACKGROUND

In order to treat or prevent various medical conditions, it is desirable to provide an automated means of repositioning patients on a mattress. For example, in order to prevent the development of pressure ulcers caused by long periods of time spent bedbound, it is desirable to regularly reposition patients to vary the distribution of pressure on the patient's skin. Turning patients often requires manual intervention by a caregiver, and can be particularly challenging for patients of larger morphotypes (body types). Other conditions such as sleep apnea can also be improved by altering the angle of a patient's body while they sleep.

Various attempts have been made in the prior art to incorporate inflatable bladders into mattresses, so that inflation of the bladders under the patient alters the shape of the mattress to control the patient's position. For example, US2015/0335507A1 discloses a mattress comprising multiple independently inflatable bladders for laterally rotating a patient to treat sleep apnea. In some prior art devices, large numbers of independently controllable bladders are used in order to allow a variety of possible mattress configurations, leading to increased device complexity.

STATEMENT OF INVENTION

The invention provides a patient positioning apparatus and a mattress, as defined in the appended independent claims, to which reference should now be made. Preferred or advantageous features of the invention are set out in dependent subclaims.

According to a first aspect of the present invention, there is provided a patient positioning apparatus for use with a mattress. The patient positioning apparatus comprises a first lateral tilt bladder configured to underlie a first side of the mattress, and a second lateral tilt bladder configured to underlie a second side of the mattress. The tilt bladders are inflatable to alter the position of a patient lying on the mattress. Inflation and/or deflation of the lateral tilt bladders is controllable by a controller, or a control unit. The first and second lateral tilt bladders extend in a longitudinal direction from a waist portion towards a head end of the patient positioning apparatus and have a length of between 690 mm and 950 mm, such that the first lateral tilt bladder is configured to tilt (or rotate) the patient's sternum towards the second side of the mattress when inflated, and the second lateral tilt bladder is configured to tilt the patient's sternum towards the first side of the mattress when inflated.

The inventors have found that the use of first and second lateral tilt bladders with a length of between 690 mm and 950 mm, or 750 mm and 950 mm, advantageously allows the first and second bladders to tilt the patient's sternum without also undesirably rotating the patient's pelvis.

In a preferred embodiment of the present invention, the patient positioning apparatus comprises a first lateral tilt bladder configured to underlie a first side of the mattress, and a second lateral tilt bladder configured to underlie a second side of the mattress. The tilt bladders are inflatable to alter the position of a patient lying on the mattress. Inflation and/or deflation of the lateral tilt bladders is controllable by a controller, or a control unit. The first and second lateral tilt bladders extend in a longitudinal direction from a waist portion towards a head end of the patient positioning apparatus and have a length of between 750 mm and 950 mm, such that the first lateral tilt bladder is configured to tilt (or rotate) the patient's sternum towards the second side of the mattress when inflated, and the second lateral tilt bladder is configured to tilt the patient's sternum towards the first side of the mattress when inflated.

Certain patient positioning protocols require the patient's body to be regularly repositioned by tilting or rotating the body from side to side. Prior art attempts to do this have typically tilted the patient's whole body, or the patient's entire torso (including both the sternum and pelvis), either by tilting the entire mattress or bed frame, or by inflating side bellows which extend substantially the entire length of the mattress. Prior art devices that have incorporated multiple smaller bladders for increased functionality typically inflate multiple bladders to tilt the patient's whole body.

Certain repositioning protocols require rotation of the patient's upper body, for example their chest, but do not require rotation of the patient's seat area or legs. The inventors of the present device have found, however, that the bladder constructions of prior art devices frequently rotate (or over-rotate) parts of the patient's body, such as the pelvis, that need not be rotated for all repositioning protocols.

Pressure ulcers occur when a patient's weight is borne on the same body part for too long, and occur commonly near bony prominences, which provide a focal point for the compression of soft tissues.

The inventors of the present device have found that, by rotating parts of the patient's body unnecessarily, the devices of the prior art can undesirably load pressure onto body parts such as the sacrum, increasing the risk of pressure ulcers in those loaded areas.

The tilting of a patient's chest may be defined by reference to the angle of their sternum relative to the horizontal. When considering lateral tilting of the type created by the present apparatus, references to tilting and sternum angle relate to side-to-side tilting, that is, in a plane taken in a transverse direction through the patient's sternum.

By using first and second lateral tilt bladders with a length of between 690 mm and 950 mm, or between 750 mm and 950 mm, under the patient's upper body, the inventors have found that the patient's sternum may be rotated relative to the horizontal substantially independently of the pelvis. This may advantageously prevent or reduce the unnecessary loading of pressure onto the patient's sacrum during upper-body repositioning protocols. This may advantageously help to reduce the occurrence of pressure sores by reducing unnecessary pressure on the sacrum.

The first and second lateral tilt bladders are configured to extend in a longitudinal direction from the waist portion towards a head end of the apparatus, so that when the apparatus is positioned underneath a mattress the bladders are positioned under an upper-body portion of the mattress. Thus, when a patient is in position on the mattress, the first and second bladders are positioned underneath the patient's upper body, with the longitudinal axes of the bladders aligned parallel to the parallel edges of the mattress.

The waist portion of the apparatus is preferably positioned so that when the apparatus is positioned underneath a mattress the waist portion underlies the waist of a patient positioned on top of the mattress.

The waist portion of the apparatus may extend laterally across the apparatus.

A waist end of the first and second bladders is located at the waist portion of the apparatus, and a head end of the first and second bladders is located near or at the head end of the apparatus.

Preferably the waist end of the first and second bladders is located at the waist portion of the apparatus, regardless of the length of the first and second bladders. As the waist end of the bladders is located at the waist portion, the distance between the head end of the first and second bladders and the head end of the apparatus preferably depends on the length of the first and second bladders.

The waist portion of the apparatus may be located a distance of at least 950 mm, or 975 mm, or 1000 mm from the head end of the apparatus, and preferably less than 1025 mm or 1050 mm from the head end of the apparatus when deflated.

The apparatus may be configured so that, in use, the waist portion of the apparatus is located a distance of at least 950 mm, or 975 mm, or 1000 mm from the head end of the mattress, and preferably less than 1025 mm or 1050 mm from the head end of the mattress By positioning the waist portion this distance from the head end of the mattress, it is ensured that the bladders are in the correct position to rotate the desired portions of the patient's body.

The length of the first and second inflatable tilt bladders may be selected to obtain a desired tilting effect on the head of a patient. For example, longer bladders preferably extend from the waist portion of the apparatus beneath the upper body and head of a patient on the mattress, while shorter bladders may not extend under the patient's head.

In a preferred embodiment, the waist ends of the first and second bladders are positioned at the waist portion of the apparatus, which is located approximately 975 mm from the head end of the apparatus, and the length of the first and second bladders is 950 mm. In this embodiment, the bladders extend almost the entire distance between the head end and the waist portion of the apparatus.

With a length of 950 mm, for example, the first and second tilt bladders extend beneath the upper body, neck and head of a patient on the mattress. The first lateral tilt bladder is therefore configured to tilt (or rotate) the patient's sternum and head towards the second side of the mattress when inflated, and the second lateral tilt bladder is configured to tilt the patient's sternum and head towards the first side of the mattress when inflated.

In a further exemplary embodiment, the waist ends of the first and second bladders are positioned at the waist portion of the apparatus, which is located approximately 975 mm from the head end of the apparatus, and the length of the first and second bladders is 750 mm. In this embodiment, the bladders extend 750 mm from the waist portion towards the head end of the apparatus, leaving a distance of approximately 225 mm between the head end of the bladders and the head end of the apparatus.

With a length of 750 mm, for example, the first and second tilt bladders extend from the waist portion, beneath the upper body of a patient on the mattress.

In yet another exemplary embodiment, the waist ends of the first and second bladders are positioned at the waist portion of the apparatus, which is located approximately 975 mm from the head end of the mattress, and the length of the first and second bladders is 720 mm when not inflated. In this embodiment, the bladders extend 720 mm from the waist portion towards the head end of the apparatus, leaving a distance of approximately 255 mm between the head end of the bladders and the head end of the mattress.

With a length of 720 mm, for example, the first and second tilt bladders extend from the waist portion, beneath the upper body of a patient on the mattress. Bladders of this length may advantageously tilt the patient's upper body and head as desired, while the length and resulting volume means that the bladders are inflatable and deflatable more rapidly than larger bladders. This is useful for certain rotational therapies. The inventors have found that this embodiment provides a good balance of inflation and deflation time, and tilting effect on a patient.

The apparatus may comprise a locating means for locating the apparatus in the correct position underneath a mattress, so that the lateral tilt bladders are positioned under the upper-body portion of the mattress. For example, the locating means may be configured to match up with a corresponding locating means on a mattress. The locating means may be configured to align the head end of the patient positioning apparatus with the head end of a mattress.

The locating means may be configured to align the waist portion of the patient positioning apparatus with a waist portion of a mattress. For example, the locating means may be configured to locate the waist portion of the patient positioning apparatus a distance of at least 950 mm, or 975 mm, or 1000 mm from the head end of the mattress, and preferably less than 1025 mm or 1050 mm from the head end of the mattress.

The first and second lateral tilt bladders are preferably elongate in shape, each having a length greater than its width.

Preferably a first end of the first and second bladders is positioned at or near the head end of the patient positioning apparatus, so that the first and second bladders are configured to extend beneath the head and upper body of a patient on the mattress. Preferably the first and second bladders are configured to tilt the head and sternum of the patient when inflated.

The apparatus may comprise the controller, or a separate controller may be connectable to the apparatus for controlling the inflation and/or deflation of the bladders.

The use of a controller, or a control unit, may advantageously allow the patient positioning apparatus to automatically rotate or reposition a patient as desired by a caregiver. The controller may be operable by a user to set the control mode desired, following which the controller may automatically control the inflation and deflation of the bladders to the required pressures, and at the required times, to perform the desired patient positioning protocol. The controller may be programmed to perform a plurality of control modes, which may be selected as desired by the user.

The first and second lateral tilt bladders may have a length of greater than or equal to 690 mm, or 700 mm, or 720 mm, or 750 mm, or 775 mm, or 800 mm, or 825 mm, or 850 mm, and less than or equal to 875 mm, or 900 mm, or 925 mm, or 950 mm when deflated. Bladders with lengths in this range may advantageously tilt the patient's sternum without undesirably rotating their pelvis. Bladders smaller than this may undesirably create pressure points under the patient's body, as a higher pressure may be required to obtain the same tilting effect using a smaller bladder. This may cause discomfort to the patient. Bladders larger than this may undesirably rotate more of the patient's body for some therapies, leading to unnecessary loading of body parts such as the sacrum.

In a particularly preferred embodiment, the first and second lateral tilt bladders extend from the head end of the apparatus and each have a length of 850 mm.

In preferred embodiments, the first and second lateral tilt bladders have a length of between 690 mm and 800 mm, preferably between 700 mm and 760 mm, particularly preferably between 710 mm and 750 mm. Bladder lengths in these ranges may advantageously be long enough to achieve the beneficial effect of tilting the patient's sternum without undesirably rotating their pelvis, while having a small enough volume that the bladders are inflatable and deflatable in a desirably short time.

In another particularly preferred embodiment, the waist ends of the first and second bladders are positioned at the waist portion of the apparatus, and the first and second lateral tilt bladders each have a length of 720 mm measured when the bladders are not inflated. This bladder length may advantageously be long enough to tilt the patient's sternum without undesirably rotating their pelvis, while having a small enough volume that the bladders may be inflatable and deflatable in a shorter time than a longer bladder.

The patient positioning apparatus may be formed from a pair of polyurethane (PU) fabric coated sheets, welded together to form air-tight bladders between the sheets. When the bladders are in a deflated state, the apparatus may therefore be advantageously flat.

The apparatus may comprise a first pressure sensor configured to sense a pressure in the first lateral tilt bladder, and a second pressure sensor configured to sense a pressure in the second lateral tilt bladder. The controller may be responsive to the first and second pressure sensors for controlling the inflation and/or deflation of the lateral tilt bladders.

Several patient positioning operations may be carried out by inflating and deflating the first and second lateral tilt bladders of the apparatus according to defined control modes.

The controller may be programmed to control the apparatus in a lateral pressure redistribution (LPR) mode, in which the first lateral tilt bladder is inflated to a predetermined LPR pressure before being deflated, and the second lateral tilt bladder may then be inflated to a predetermined LPR pressure before being deflated, so that the patient's sternum is tilted in one direction and then optionally in another direction.

The controller may be programmed to control the apparatus in a sleep apnea prevention mode, in which either the first lateral tilt bladder or the second lateral tilt bladder is inflated to a predetermined pressure, so that the patient's head and sternum are tilted in a desired direction.

The control mode in which the controller operates at a given time may be selectable by a user, for example a caregiver. Parameters such as the pressure to which the bladders are inflated, and the timings of inflation and deflation steps, may be selectable by a user, and/or may be programmed into the controller as part of the selectable control modes.

In a preferred embodiment, the apparatus additionally comprises a third lateral tilt bladder configured to underlie the first side of the mattress, and a fourth lateral tilt bladder configured to underlie the second side of the mattress. The third and fourth bladders are positioned such that the third lateral tilt bladder is configured to tilt the patient's pelvis towards the second side of the mattress when inflated, and the fourth lateral tilt bladder is configured to tilt the patient's pelvis towards the first side of the mattress when inflated.

The incorporation of third and fourth bladders into the allows the apparatus to rotate the patient's pelvis as well as their sternum. This increases the range of positioning protocols that the apparatus can carry out.

The third and fourth bladders may be positioned between the waist portion and the foot end of the apparatus.

The third and fourth lateral tilt bladders are positioned in line with the first and second bladders, respectively, towards a foot-end of the apparatus. The first bladder may be positioned between the third bladder and the head end of the apparatus, and the second bladder may be positioned between the fourth bladder and the head end of the apparatus. The third and fourth lateral tilt bladders may preferably have a length of greater than or equal to 400 mm, or 425 mm, or 450 mm, or 480 mm, and less than or equal to 500 mm, or 525 mm, or 550 mm when deflated.

The first and third lateral tilt bladders, and the second and fourth tilt bladders, respectively, may be separated by a longitudinal distance of greater than or equal to 45 mm, or 50 mm, or 60 mm, and less than or equal to 75 mm, or 85 mm. By providing a longitudinal separation between the ends of the bladders, the apparatus may advantageously isolate tilting of the patient's sternum (caused by inflation of the first or second bladders) from tilting of the pelvis (caused by inflation of the third or fourth bladders). The separation in between tilting bladders may also provide better patient support when the bed supporting the mattress is articulated and both bladders are inflated. The first and third lateral tilt bladders, and the second and fourth tilt bladders, respectively, may be separated by a spacing means. The spacing means may advantageously reinforce a space between the bladders, and decouple adjacent bladders to isolate the tilting effect of one bladder from another. Where the apparatus comprises RF welded sheets, the spacing means may comprise one or more welded strips, which may extend across a portion of the apparatus in a transverse direction between adjacent bladders.

The apparatus may comprise an opening, or slit, arranged between the first and third lateral tilt bladders. The apparatus may comprise an opening, or slit, arranged between the second and fourth lateral tilt bladders. The first and third lateral tilt bladders, and the second and fourth tilt bladders, respectively, may be separated by an opening, or slit, through the apparatus. The opening may be located at the waist portion of the apparatus. For example, where the apparatus comprises a pair of welded sheets, the sheets may be welded around the opening, and the opening may extend through the apparatus. The presence of an opening or slit through the apparatus may advantageously prevent the transmission of strains caused by inflation of an upper-body bladder into the seat portion of the apparatus. The opening may also decouple the tilting effects of adjacent bladders on either side of the opening, to further reduce unwanted rotation of the patient's body.

The apparatus may comprise only the first and second lateral tilt bladders, or only the first, second, third and fourth lateral tilt bladders. With only two or four inflatable bladders, the apparatus may perform a range of positioning functions, while the control and maintenance of the apparatus may advantageously be simplified compared to prior art devices comprising large numbers of bladders.

Each lateral tilt bladder may have separate inflation inlet, so that the controller may control fluid to flow to any one or more of the bladders as desired. The controller may be configured to control a pump to provide fluid, for example air, to the bladders via their respective inflation inlets.

In one preferred embodiment, the four lateral tilt bladders of the patient positioning apparatus may all be independently inflatable and deflatable.

In addition to the first and second pressure sensors, the apparatus may comprise a third pressure sensor configured to sense a pressure in the third lateral tilt bladder, and a fourth pressure sensor configured to sense a pressure in the fourth lateral tilt bladder. The controller may be responsive to the third and fourth pressure sensors for controlling the inflation and/or deflation of the third and fourth lateral tilt bladders. This may advantageously allow each bladder to be independently controllable, so that the apparatus can perform the maximum range of operations, with all bladders inflated or deflated as desired.

For all positioning protocols it is desirable for the controller to know the pressure in all bladders. For example, in certain operating modes it may be desirable to inflate different bladders to different pressures. In the prior art this desire has meant that each inflatable bladder is typically provided with its own pressure sensor, so that the devices may be controlled in response to pressures sensed in each separate bladder. The incorporation of large numbers of pressure sensors, however, increases both the complexity and cost of the devices.

In another preferred embodiment of the present patent positioning apparatus, the apparatus comprises four bladders but only the first and second pressure sensors. In this embodiment, a first check valve is configured to allow fluid communication in one direction from the third lateral tilt bladder to the first lateral tilt bladder, and/or a second check valve is configured to allow fluid communication in one direction from the fourth lateral tilt bladder to the second lateral tilt bladder.

A check valve may alternatively be termed a non-return valve.

In this embodiment, the use of first and second check valves means that it is not necessary to provide third and fourth pressure sensors for the controller to know the pressure in the third and fourth lateral tilt bladders. By controlling the apparatus to inflate the bladders in the correct order, the pressures in all four bladders may be communicated to the controller by the first and second pressure sensors. This arrangement still allows a wide range of positioning protocols, while providing significant benefits in terms of reduced system complexity and improved reliability compared to systems using dedicated pressure sensors for all bladders.

In this embodiment, the controller can inflate both the first and third bladders (or the second and fourth) to the same fluid pressure, for example by pumping fluid into the third bladder. As long as the pressure in the third bladder is higher than the pressure in the first bladder, fluid will flow through the check valve from the third bladder to the first bladder, so the pressures in the first and third bladders are kept equal. As the first pressure sensor measures the pressure in the first bladder, this measurement is communicated to the controller and used to control the inflation.

Alternatively, the controller can inflate the first bladder to a higher pressure than the third bladder, in order to tilt the patient's sternum to a greater angle than their pelvis. This may be done by inflating both bladders to a predetermined lower pressure at which no fluid flows through the check valve. As described above, this can be done by pumping fluid into the third bladder. When the first pressure sensor senses that the pressure in the first bladder has reached the predetermined lower pressure, the controller stops inflation of the third bladder. Due to the check valve, the pressure in both bladders is known to be equal at the predetermined lower pressure. The controller then further inflates the first bladder by controlling a pump to pump fluid into the first bladder until it reaches a predetermined higher pressure, which is higher than the predetermined lower pressure. As the pressure in the first bladder is higher than the pressure in the third bladder, no fluid can flow through the check valve from the third bladder to the first bladder, and the third bladder remains at the lower predetermined pressure. This allows third bladder to be inflated to a known pressure different from the pressure in the first bladder, even though the first pressure sensor only senses the pressure in the first bladder.

A corresponding inflation protocol may be used with the second and fourth bladders in order to tilt the patient in the opposite direction.

LPR and sleep apnea control modes may be carried out using four-bladder embodiments as described above, while keeping the third and fourth lateral tilt bladders deflated. In addition to these modes, further positioning protocols are made possible by the presence of the third and fourth bladders.

The controller may be programmed to control the apparatus in a Continuous Lateral Rotation Therapy (CLRT) mode in which the first and third lateral tilt bladders are inflated to a predetermined CLRT pressure, following which the first and third bladders are deflated and the second and fourth bladders are inflated to the predetermined CLRT pressure, in which the inflation cycle is repeated to continuously rotate the patient on the mattress.

Each bladder may have its own predetermined CLRT pressure, which may differ from that of another bladder.

The first lateral tilt bladder may be inflated to a higher pressure than the third bladder, and the second lateral tilt bladder may be inflated to a higher pressure than the fourth bladder, so that the patient's torso is rotated to a greater angle than their pelvis during the CLRT cycle. This may advantageously reduce the pressure loading on the sacrum during CLRT.

Where each bladder is inflatable independently and has its own dedicated pressure sensor, fluid may be pumped into each bladder independently until it reaches the predetermined CLRT pressure for that bladder.

Where the apparatus comprises only first and second pressure sensors, and first and second check valves, however, the first and second bladders may be inflated to a pressure higher than the third and fourth bladders, respectively, as described above.

The controller may be programmed to control the apparatus in a turn assist mode, in which the first and third bladders are both inflated to tilt the patient towards the second side of the mattress, or the second and fourth bladders are both inflated to tilt the patient towards the first side of the mattress.

The apparatus may comprise a plurality of inflation ports, each of which is in fluid communication with a respective lateral tilt bladder. The inflation ports are preferably configured to be connectable directly to the outlets of an inflation manifold. By connecting inflation ports in the apparatus directly to the manifold, ie. without connecting pipes or hoses between them, airflow losses caused by additional connections, joints and connecting pipes may advantageously be reduced. By reducing the distance between the inflation manifold and the inflation ports, inflation time may also be reduced.

In a preferred embodiment, the inflation ports comprise plastic inserts which are inserted and welded directly into RF-welded conduits in the apparatus.

In order to allow rapid inflation of the bladders, the inflation ports may have a diameter of between 15 mm and 20 mm, or between 17.5 mm and 19 mm, for example 18.5 mm. These relatively large-diameter inlets may advantageously allow rapid inflation of the bladders by removing airflow constraints typically created by connecting tubing.

The inflation ports may be positioned at the foot-end of the patient positioning apparatus, which may minimise any discomfort to the patient. The inflation ports may be connected to their respective bladders by conduits defined between RF weld lines.

Both the conduits and the bladders may be formed between RF weld lines. In a preferred embodiment, portions of the weld lines defining the third and fourth bladders also serve as portions of the weld lines defining the conduits to the first and second bladders, respectively. This arrangement may be advantageously strong and space efficient.

According to a second aspect of the invention there is provided a mattress comprising a mattress layer and a patient positioning apparatus according to any preceding claim, in which the patient positioning apparatus is positioned beneath the mattress layer, so that inflation of the lateral tilt bladders moves the mattress layer to alter the lateral position of a patient lying on the mattress layer.

The mattress layer may be, for example, a mattress surface layer, or an overlay, or an upper air mattress layer.

By positioning the patient positioning apparatus below one or more mattress layers, the patient may advantageously be cushioned from the hard-feeling inflated bladders by the mattress layer(s). The apparatus may thus still perform the desired positioning protocols with less discomfort for the patient. This is unlike certain prior art devices, the bladders of which are provided on or near an upper surface so that they protrude out of the patient-supporting surface of the mattress to exert a pressure on the patient.

According to a third aspect of the invention there is provided a mattress system comprising a mattress according to the second aspect of the invention, a pump and an inflation manifold connectable to the lateral tilt bladders, in which the pump is controllable by the controller to pump fluid through the inflation manifold to inflate or deflate the bladders.

According to a fourth aspect of the invention there is provided a patient positioning apparatus for use with a mattress, the patient positioning apparatus comprising:

a first lateral tilt bladder and a third lateral tilt bladder configured to underlie a first side of the mattress, and a second lateral tilt bladder and a fourth lateral tilt bladder configured to underlie a second side of the mattress, in which the tilt bladders are inflatable to alter the position of a patient lying on the mattress; in which inflation and/or deflation of the lateral tilt bladders is controllable by a controller; and in which the first lateral tilt bladder is configured to tilt the patient's sternum towards the second side of the mattress when inflated, the second lateral tilt bladder is configured to tilt the patient's sternum towards the first side of the mattress when inflated, the third lateral tilt bladder is configured to tilt the patient's pelvis towards the second side of the mattress when inflated, and the fourth lateral tilt bladder is configured to tilt the patient's pelvis towards the first side of the mattress when inflated, in which a first check valve is configured to allow fluid communication in one direction from the third lateral tilt bladder to the first lateral tilt bladder, and a second check valve is configured to allow fluid communication in one direction from the fourth lateral tilt bladder to the second lateral tilt bladder.

The check valve may advantageously optimise the inflation time of the bladders and provide a comfortable position for the patient during the inflation during rotational therapies such as CLRT, or in turn assist mode.

The check valve may alternatively be termed a non-return valve.

The check valve between the third bladder and the first bladder is configured so that fluid, such as air, flows through the check valve from the third to the first bladder when the pressure in the third inflatable bladder is higher than the pressure in the first inflatable bladder. Likewise, the check valve between the fourth bladder and the second bladder is configured so that fluid flows through the check valve from the fourth to the second bladder when the pressure in the fourth inflatable bladder is higher than the pressure in the second inflatable bladder.

The third and fourth inflatable bladders preferably have a smaller volume than the first and second inflatable bladders.

This arrangement of bladders and check valves is particularly suitable, for example, for use in CLRT mode or turn assist mode, as it means that the smaller third/fourth bladders can be inflated at the same relative rate as the larger first/second bladders even if air is delivered to the bladders at the same flow rate. In CLRT and turn assist modes, the seat bladder and torso bladder that are positioned on the same side of the apparatus (first and third, or second and fourth) are inflated simultaneously, to tilt the patient's pelvis and torso in the same direction.

The use of check valves that allow air to flow from the seat bladders (the third and fourth bladders) to the torso bladders (the first and second bladders) ensures that the seat bladders are never inflated to a higher pressure than the corresponding torso bladders. If the pressure in the seat bladders exceeds that in the torso bladders, air automatically flows through the check valve towards the torso bladders to balance the pressure across the valve. During inflation of a pair of bladders (first and third, or second and fourth bladders) during CLRT mode, for example, this means that the patient's pelvis never tilts to a higher angle than their sternum, which would produce an uncomfortable position for the patient.

In certain control modes, the controller preferably controls the rate of airflow to the bladders during inflation so that the same airflow flow rate is provided to all bladders that are being inflated. This may advantageously allow for simplified construction and control of the apparatus, and may allow the use of a simple air supply that provides air at a single flow rate.

As the seat bladders (the third and fourth bladders) have smaller volumes than the torso bladders (the first and second bladders), if there were no check valves, providing air to a seat bladder and a larger torso bladder at the same flow rate would mean the seat bladders were fully inflated before the torso bladders. The patient's pelvis would be tilted to a greater angle than their sternum in this situation, which would cause discomfort. The use of check valves between the seat bladders and the torso bladders avoids this problem, as air can be provided to the seat bladder and the torso bladder at the same flow rate, and the check valve allows air to flow from the seat bladder (the third bladder, for example) to the larger torso bladder (the first bladder, for example) during inflation. The pressure in the seat bladder and the torso bladder is therefore balanced throughout the inflation, even though the torso bladder has a larger volume than the seat bladder. This allows the larger torso bladder to be inflated faster than would otherwise be possible, and provides simultaneous tilting of the sternum and pelvis of the patient to reach the correct tilt position for CLRT.

The apparatus may comprise a first pressure sensor configured to sense a pressure in the first lateral tilt bladder, and a second pressure sensor configured to sense a pressure in the second lateral tilt bladder. The controller may be responsive to the first and second pressure sensors for controlling the inflation and/or deflation of the lateral tilt bladders.

The use of first and second check valves means that it is not necessary to provide third and fourth pressure sensors for the controller to know the pressure in the third and fourth lateral tilt bladders. By controlling the apparatus to inflate the bladders in the correct order, the pressures in all four bladders may be communicated to the controller by the first and second pressure sensors. This arrangement still allows a wide range of positioning protocols, while providing significant benefits in terms of reduced system complexity and improved reliability compared to systems using dedicated pressure sensors for all bladders.

Further features of the fourth aspect of the invention are described above in relation to the first aspect of the invention.

According to a fifth aspect of the invention there is provided a method of positioning a patient on a mattress, comprising the steps of: providing a first lateral tilt bladder underneath a first side of the mattress, and a second lateral tilt bladder underneath a second side of the mattress, in which the first and second lateral tilt bladders extend longitudinally from a head end of the mattress and have a length of between 690 mm and 950 mm, or between 750 mm and 950 mm; selecting a positioning mode; and inflating the lateral tilt bladders according to the selected positioning mode so that the patient's sternum is laterally tilted on the mattress.

The method may comprise the step of selecting a patient morphotype; and inflating the lateral tilt bladders to a predetermined pressure corresponding to the selected morphotype.

The positioning mode may be a lateral pressure redistribution (LPR) mode, and in which the method comprises the steps of: inflating the first lateral tilt bladder to a predetermined pressure; deflating the first lateral tilt bladder after a predetermined time; inflating the second lateral tilt bladder to a predetermined pressure; deflating the second lateral tilt bladder after a predetermined time; and repeating the inflation cycle, so that the patient's sternum is repeatedly tilted in one direction and then in another direction relative to their pelvis.

The lateral tilt bladders may be inflated to: a) a first pressure when the patient morphotype is a first morphotype with a weight lower than a predetermined weight range; b) a second pressure higher than the first pressure when the patient morphotype is a second morphotype with a weight within the predetermined weight range; or c) a third pressure higher than the second pressure when the patient morphotype is a third morphotype with a weight higher than a predetermined weight range.

The positioning mode may be a sleep apnea prevention mode, in which the method comprises the steps of: inflating either the first lateral tilt bladder or the second lateral tilt bladder to a predetermined pressure, so that the patient's sternum is tilted relative to the horizontal.

The method may comprise the steps of providing a third lateral tilt bladder underneath the first side of the mattress beneath the patient's pelvis, and a fourth lateral tilt bladder underneath the second side of the mattress beneath the patient's pelvis, so that inflation of the third or fourth bladders tilts the patient's pelvis relative to the horizontal.

The positioning mode may be a Continuous Lateral Rotation Therapy (CLRT) mode, and the method may comprise the steps of inflating the first and third lateral tilt bladders to a predetermined CLRT pressure; deflating the first and third bladders; inflating the second and fourth bladders to the predetermined CLRT pressure; deflating the second and fourth bladders; and repeating the inflation cycle to continuously laterally rotate the patient on the mattress.

In CLRT mode, the first and second bladders may be inflated to a higher pressure than the third and fourth bladders, so that the patient's sternum is tilted to a greater angle than their pelvis during the CLRT cycle.

The positioning mode may be a turn assist mode, in which the method comprises the steps of: inflating both the first and third bladders to tilt the patient towards the second side of the mattress; or inflating both the second and fourth bladders to tilt the patient towards the first side of the mattress.

According to a sixth aspect of the invention there is provided a patient positioning apparatus for use with a mattress, the patient positioning apparatus comprising: a first lateral tilt bladder and a third lateral tilt bladder configured to underlie a first side of the mattress, and a second lateral tilt bladder and a fourth lateral tilt bladder configured to underlie a second side of the mattress, in which the tilt bladders are inflatable to alter the position of a patient lying on the mattress; in which inflation and/or deflation of the lateral tilt bladders is controllable by a controller; and in which the first lateral tilt bladder is configured to tilt the patient's sternum towards the second side of the mattress when inflated, the second lateral tilt bladder is configured to tilt the patient's sternum towards the first side of the mattress when inflated, the third lateral tilt bladder is configured to tilt the patient's pelvis towards the second side of the mattress when inflated, and the fourth lateral tilt bladder is configured to tilt the patient's pelvis towards the first side of the mattress when inflated. The controller is preferably programmed to control the apparatus in a Continuous Lateral Rotation Therapy (CLRT) mode in which the first and third lateral tilt bladders are inflated to a predetermined CLRT pressure, following which the first and third bladders are deflated and the second and fourth bladders are inflated to the predetermined CLRT pressure, in which the inflation cycle is repeated to continuously rotate the patient on the mattress.

The controller may be programmed to control the apparatus so that in Continuous Lateral Rotation Therapy (CLRT) mode the first lateral tilt bladder is inflated to a higher pressure than the third bladder, and the second lateral tilt bladder is inflated to a higher pressure than the fourth bladder, so that the patient's torso is rotated to a greater angle than their pelvis during the CLRT cycle.

This may advantageously reduce unnecessary pressure on the sacrum during CLRT mode.

Preferably a first check valve is configured to allow fluid communication in one direction from the third lateral tilt bladder to the first lateral tilt bladder, and a second check valve is configured to allow fluid communication in one direction from the fourth lateral tilt bladder to the second lateral tilt bladder. Advantages of this arrangement are set out above.

It will be appreciated that features described in relation to one aspect of the present invention may also be applied equally to all of the other aspects of the present invention. Features described in relation to the first aspect of the present invention may be applied equally to the second, third, fourth and sixth aspects of the present invention and vice versa. Features described in relation to the second aspect of the present invention may be applied equally to the third, fourth and sixth aspects of the present invention and vice versa.

BRIEF DESCRIPTION OF DRAWINGS

The invention will be further described, by way of example only, with reference to the accompanying drawings, in which.

DETAILED DESCRIPTION OF DRAWINGS

Figure 1:
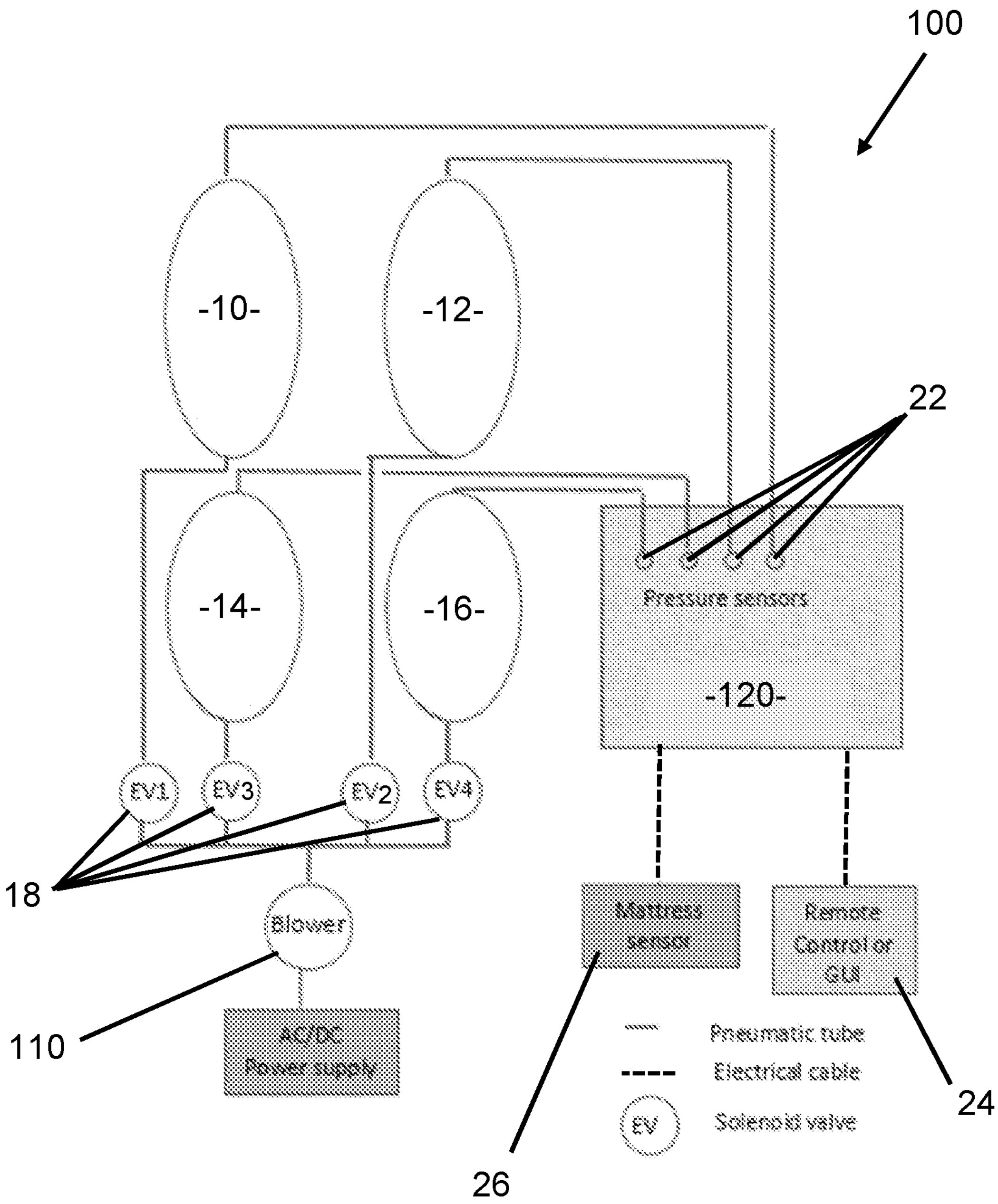
FIG. 1 shows a schematic illustration of a patient positioning apparatus, pump and controller according to a first embodiment of an aspect of the invention.

FIG. 1 shows a schematic plan view of a first embodiment of a patient positioning apparatus 100 connected to a pump 110 and a controller 120.

The patient positioning apparatus comprises a first inflatable bladder 10 positioned next to an identical second inflatable bladder 12. The first and second inflatable bladders 10, 12 are oblong in shape with rounded corners, and have a length of 850 mm. A waist end 11 of the first and second inflatable bladders is located at a waist portion of the apparatus, and a head end 13 of the bladders is located adjacent a head end of the apparatus.

A third inflatable bladder 14 is positioned below the first inflatable bladder 10, and a fourth inflatable bladder 16 is positioned below the first inflatable bladder 12. Each of the inflatable bladders is connected to a separate inlet valve 18 by pneumatic tubing. The four inlet valves 18 are connected to the pump 110 via an inflation manifold (not shown). Each of the inflatable bladders is also connected to a separate pressure sensor 22 and an outlet valve (not shown).

The controller 120 comprises of an electronic circuit board 24 which is connected to receive measurements from the pressure sensors 22. A user may interact with the controller, for example to input information or select a control mode, via a graphic user interface 24. In this exemplary embodiment a mattress sensor 26 is connected to the controller to provide the controller with information about patient immersion in the mattress. The controller is electrically connected to the pump 110, the inlet valves 18 and the outlet valves so that the controller can control the operation of the pump and the individual valves.

In use, the four inflatable bladders 10, 12, 14, 16 are positioned on a bed frame beneath a mattress layer (not shown). The bladders are configured to align with the mattress layer so that the waist ends 11 of the first and second inflatable bladders 10, 12 are positioned under a waist portion of the mattress, and the third and fourth inflatable bladders 14, 16 are positioned under a middle section of the mattress, such that the first and third bladders underlie one side of the mattress layer and the second and fourth bladders underlie the other side of the mattress layer. When a patient lies on the mattress in a supine position (on their back, facing upwards), the patient's chest and upper body is positioned directly above the first and second inflatable bladders, while their pelvis is positioned above the third and fourth inflatable bladders.

The controller 120 is programmed to control the inflation and deflation of the four bladders 10, 12, 14, 16 according to a control mode selected by a user on the graphic user interface 24. Different control modes require one or more of the inflatable bladders to be inflated for a certain time, and to a certain pressure, in a predetermined pattern.

In order to inflate a selected inflatable bladder, the controller activates a power supply to the pump 110, and opens the corresponding inlet valve 18 so that the pump drives air through the valve and into the inflatable bladder. As the bladder inflates, the pressure sensor 22 corresponding to that bladder measures the air pressure inside the bladder, and communicates that pressure to the controller 120. When the pressure in the bladder has reached a predetermined level, the controller closes the valve 18 and deactivates the pump 110.

Inflation of one or more of the bladders causes the mattress overlay, and the patient on the mattress overlay, to tilt laterally away from the inflated bladder. So by inflating bladders in sequence, the patient may be rotated in a lateral plane as desired.

In particular, inflation of the first lateral tilt bladder tilts the patient's sternum towards one side of the mattress, while inflation of the second lateral tilt bladder is configured to tilt the patient's sternum towards the other side of the mattress. Inflation of the third lateral tilt bladder tilts the patient's pelvis towards one side of the mattress, while inflation of the fourth lateral tilt bladder tilts the patient's pelvis towards the other side of the mattress.

In order to deflate the bladder, the controller opens the corresponding outlet valve.

The controller can operate the apparatus 100 to perform a variety of patient positioning protocols by inflating and deflating the bladders as appropriate for the selected control mode.

The 850 mm length of the first and second inflatable bladders 10, 12 advantageously means that these bladders extend beneath the head and chest of a patient on the mattress overlay, but do not extend as far as the patient's pelvis. This means that, during positioning protocols for which only the patient's upper body should be tilted, the patient's pelvis is not tilted by the inflated bladders. This advantageously avoids loading pressure from the patient's weight onto the patient's sacrum when it is only necessary to rotate the patient's chest. This may advantageously help to reduce the occurrence of pressure sores, by reducing unnecessary pressure on the sacrum.

Figure 2:
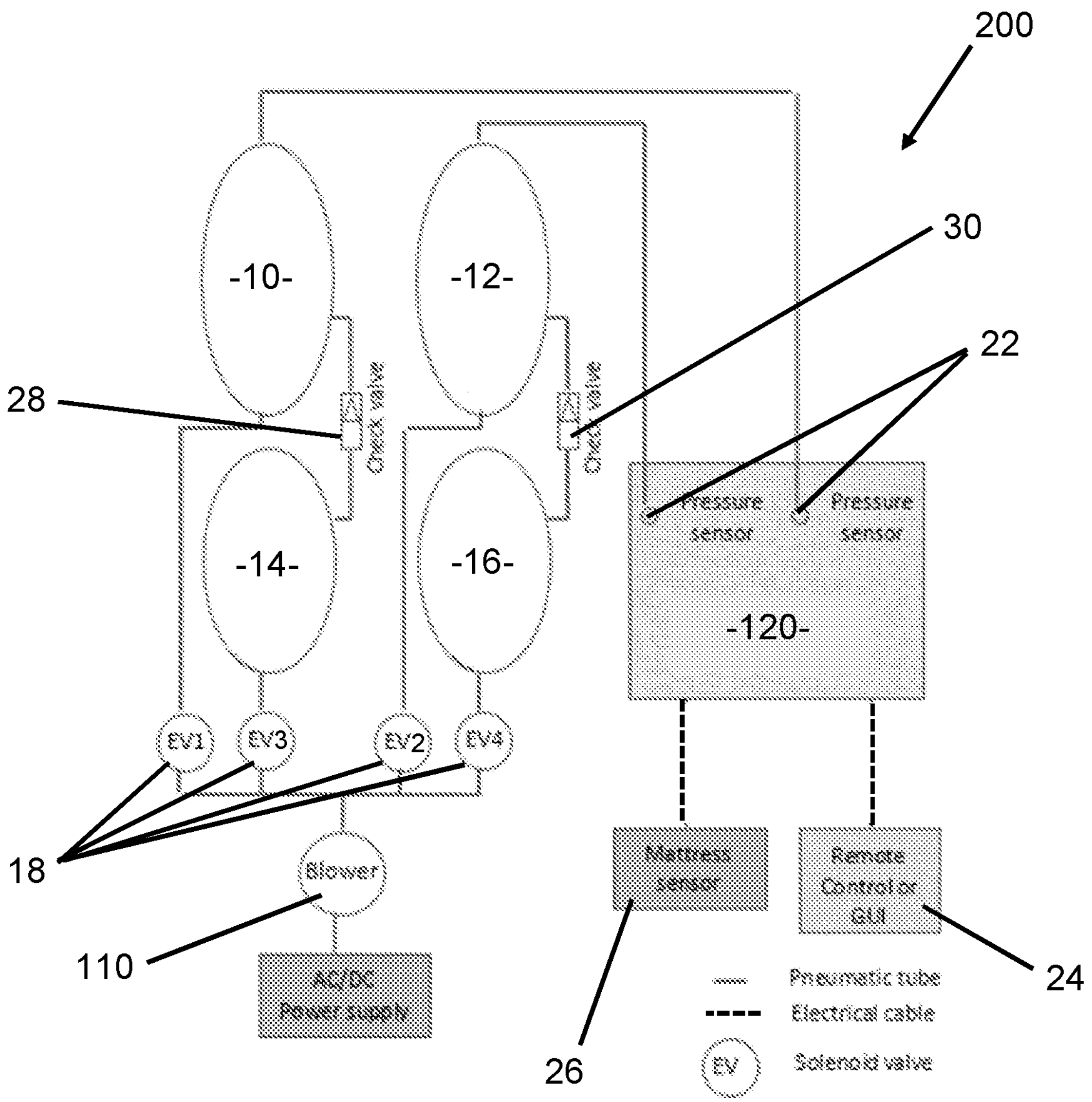
FIG. 2 shows a schematic illustration of a patient positioning apparatus, pump and controller according to a second embodiment of an aspect of the invention.

An alternative embodiment of a patient positioning apparatus 200 is shown schematically in FIG. 2.

The apparatus 200 consists of the same components as those of the first embodiment of the apparatus 100, with the difference that the third and fourth inflatable bladders 14, 16 are not connected to their own pressure sensors 22. Instead, the third inflatable bladder 14 is in fluid communication with the first inflatable bladder 10 via a first check valve 28, and the fourth inflatable bladder 16 is in fluid communication with the second inflatable bladder 12 via a second check valve 30. The apparatus comprises only two pressure sensors 22, which are connected to the first and second inflatable bladders respectively.

The first check valve 28 is arranged to allow fluid to flow only in one direction from the third inflatable bladder 14 to the first inflatable bladder 10. Fluid flow from the first bladder to the third bladder is prevented by the check valve. In this configuration, fluid flows through the check valve from the third to the first bladder when the pressure in the third inflatable bladder is higher than the pressure in the first inflatable bladder. Likewise, the second check valve 30 is arranged to allow fluid to flow only from the fourth inflatable bladder 16 to the second inflatable bladder 12, and to prevent flow in the opposite direction.

The presence of the check valves means that the third and fourth inflatable bladders cannot be inflated without at least partial inflation of the first and second bladders, as fluid will flow through the check valves as a result of the pressure difference across the valves.

This solution is different to the approach of providing independently inflatable bladders, and slightly restricts the functionality of the apparatus 200 as the third and/or fourth bladders cannot be inflated on their own. The inventors have found, however, that this arrangement allows the apparatus 200 to perform a variety of positioning functions and protocols, while advantageously providing a simplified device. The check valves also advantageously ensure that in CLRT mode or turn assist mode, when the third and first (or fourth and second) bladders are being inflated simultaneously and air is being delivered to both bladders at the same flow rate, the check valve balances the pressure between bladders so that both bladders inflate at the same relative rate even though the volume of the third bladder is smaller than the volume of the first bladder. This means that the patient's pelvis and torso are tilted at the same angle as the bladders inflate.

Figure 3:
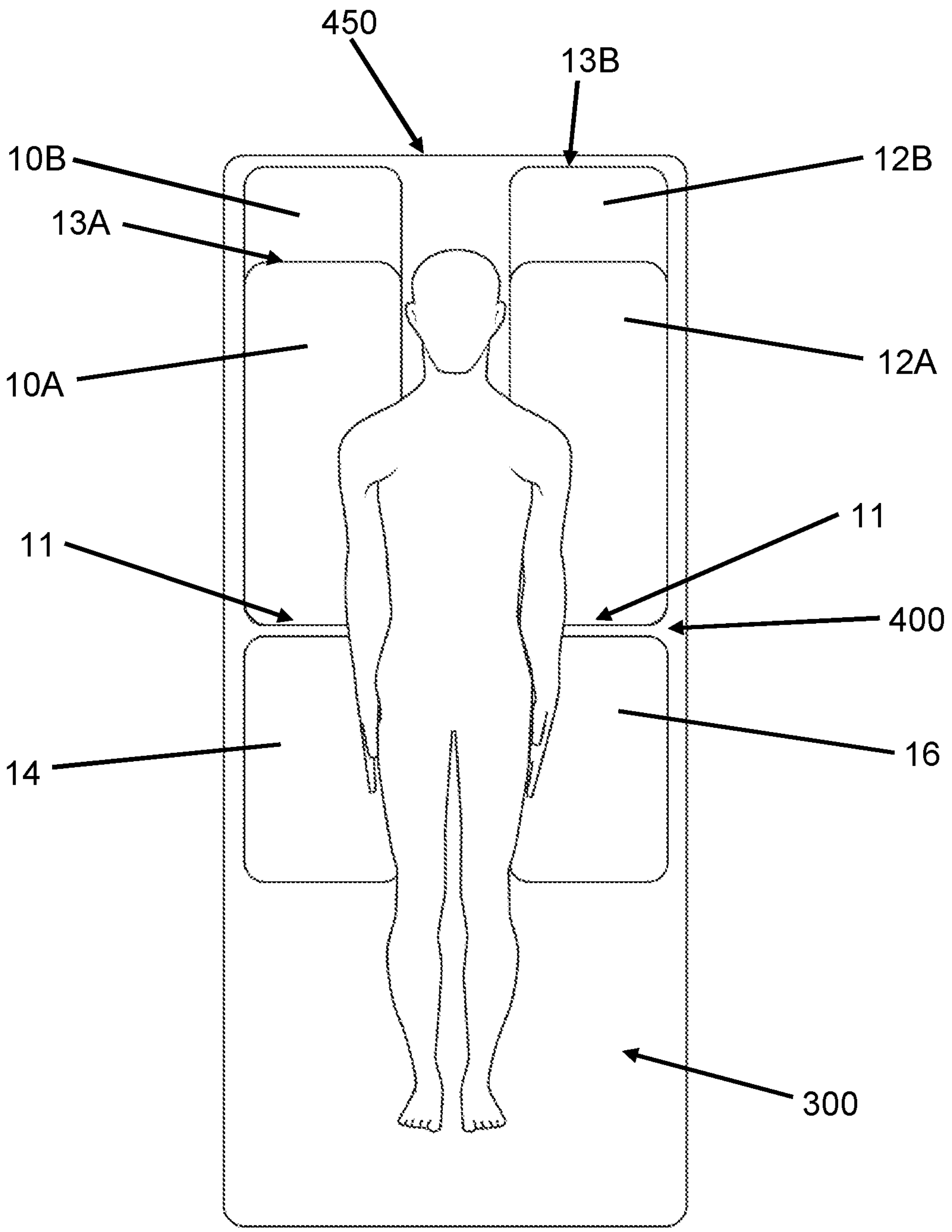
FIG. 3 shows a schematic plan view of a patient above a patient positioning apparatus according to an aspect of the invention.

FIG. 3 illustrates the position of a patient on a mattress 300 above the bladders of a patient positioning apparatus. FIG. 3 shows the positions of the first, second, third and fourth lateral tilt bladders 10, 12, 14, 16 relative to the patient and the mattress 300. The patient positioning apparatus of FIG. 3 may be a patient positioning apparatus 100, 200 according to either of the embodiments shown in FIGS. 1 and 2.

FIG. 3 shows two alternative sizes of the first bladder 10A, 10B and second bladder 12A, 12B to illustrate preferred positions of differently sized bladders relative to a mattress, and relative to a patient.

In FIG. 3, first and second bladders 10A, 12A have a length of 750 mm. The waist end 11 of the first and second inflatable bladders 10A, 12A is located at a waist portion 400 of the apparatus, beneath a waist portion of the mattress. The waist portion 400 extends laterally across the apparatus and underlies the waist of the patient positioned on top of the mattress. As the first and second bladders 10A, 12A have a length of 750 mm, the head end 13A of the bladders 10A, 12A is located between the waist portion 400 and the head end 450 of the mattress, a distance of 750 mm from the waist portion. This leaves a separation of approximately 225 mm between the head end 13A of the bladders and the head end 450 of the mattress 300.

The proportion of the patient overlying the first and second bladders 10A, 12A depends on the height of the patient. In the embodiment illustrated in FIG. 3, the first and second bladders 10A, 12A extend under the patient's upper body from the waist portion to a position approximately underneath the top of the patient's head.

FIG. 3 also shows an alternative embodiment of the first and second bladders 10B, 12B with a length of 950 mm. The 750 mm-bladder embodiment 10A, 12A and the 950 mm-bladder embodiment 10B, 12B are shown overlaid upon one another for the purposes of comparative illustration in FIG. 3.

First and second bladders 10B, 12B have a length of 950 mm. Similarly to the 750 mm bladders, the waist end 11 of the 950 mm bladders is located at a waist portion 400 of the apparatus. The head end 13B of the bladders 10B, 12B is located between the waist portion 400 and the head end 450 of the mattress, a distance of 950 mm from the waist portion. In this embodiment, the 950 mm bladders extend almost to the head end 450 of the mattress 300. This leaves a separation of approximately 25 mm between the head end 13B of the bladders and the head end 450 of the mattress 300.

In this embodiment the 950 mm bladders 10B, 12B may advantageously extend beneath the neck and head of even the tallest patients. This may be preferable, for example, where the apparatus is to be used for sleep apnea treatment.

As the first and second bladders extend from the same position at the waist portion 400, the position of the bladders relative to the torso and sacrum of the patient may advantageously be maintained regardless of bladder length.

The mattress 300 may comprise some locating means (not shown) to ensure that the patient adopts the correct position, with their waist positioned above the waist portion 400 of the apparatus.

In a particularly preferred embodiment, the first and second bladders 10A, 12A have a length of 721 mm. The waist end 11 of the first and second inflatable bladders 10A, 12A is located at a waist portion 400 of the apparatus, beneath a waist portion of the mattress. The waist portion 400 extends laterally across the apparatus and underlies the waist of the patient positioned on top of the mattress. As the first and second bladders 10A, 12A have a length of 721 mm, the head end 13A of the bladders 10A, 12A is located between the waist portion 400 and the head end 450 of the mattress, a distance of 721 mm from the waist portion. This leaves a separation of approximately 254 mm between the head end 13A of the bladders and the head end 450 of the mattress 300.

Figure 4:
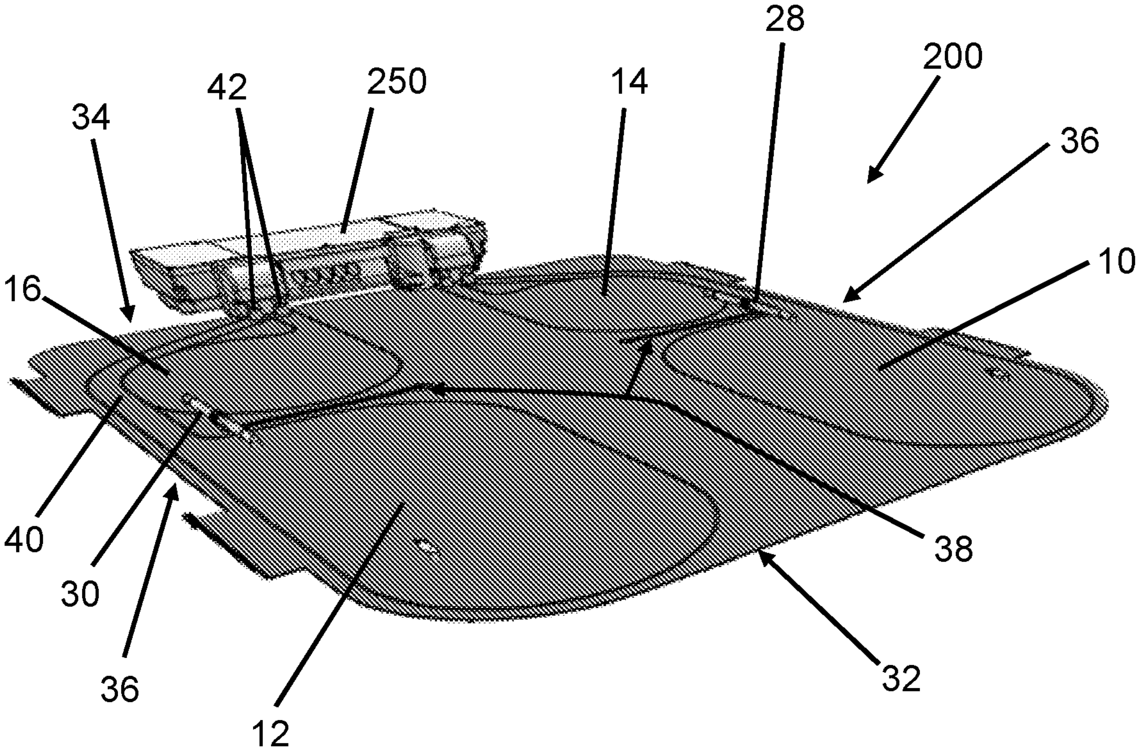
FIG. 4 shows a schematic perspective view of a patient positioning apparatus and inflation manifold according to an embodiment of an aspect of the invention.

FIG. 4 shows a perspective view of the patient support apparatus 200 connected to a combined pump and inflation manifold 250, which contains four inlet valves (not shown).

The apparatus 200 is formed from two polyurethane (PU) fabric coated sheets, welded together to form first, second, third and fourth 10, 12, 14, 16 inflatable bladders therebetween. The apparatus is generally flat when the bladders are in a deflated state, and is generally oblong in shape, with a head-end 32 of the apparatus connected to a foot-end 34 by two sides 36.

The first inflatable bladder 10 and the second inflatable bladder 12 are generally oblong in shape, and are positioned symmetrically on first and second sides of the apparatus, so that longitudinal axes of the bladders are parallel with the sides 36 of the apparatus. The first and second bladders 10, 12 are positioned to extend parallel with the sides 36 from the head-end 32 of the apparatus over approximately half of the length of the apparatus. In the embodiment shown, the first and second bladders have a length of 850 mm, measured in a longitudinal direction parallel to the sides of the apparatus 200, and a width of 450 mm, measured in a transverse direction parallel to the head-end edge 32 of the apparatus.

The third inflatable bladder 14 is positioned between the first bladder 10 and the foot-end 34 of the apparatus, and is generally oblong in shape. The fourth inflatable bladder 16 is positioned between the second bladder 12 and the foot-end 34 of the apparatus, and is formed as a mirror image of the third bladder. In the embodiment shown, the third and fourth inflatable bladders have a length of 450 mm and a width of 400 mm.

First and second check valves 28, 30 extend between the first and third inflatable bladders, and the second and fourth inflatable bladders, respectively.

The first and third bladders, and the second and fourth bladders, are respectively separated by a longitudinal distance of approximately 60 mm. Adjacent bladders are additionally separated by openings 38, formed by cuts through the apparatus and surrounded by lines of RF welding. The openings 38 extend in a transverse direction across the waist portion of the apparatus. Separate RF-welded conduits 40 extend from each inflatable bladder to inflation ports 42 positioned at the foot-end 34 of the apparatus. The inflation ports 42 are formed from cyclindrical plastic inserts, which are welded directly into the conduits in the apparatus. The inserts are sized to receive and connect directly to outlets on the inflation manifold 250.

The dimensions of the apparatus 200 are such that it may be positioned beneath a mattress overlay, and optionally other components of a mattress, so that the bladders are positioned under specific portions of the mattress. The width of the apparatus 200 is approximately the same as the width of the mattress overlay, while the length of the apparatus is approximately two-thirds of the length of the mattress overlay. By positioning the head-end of the apparatus in line with the head-end of the mattress overlay, these dimensions mean that, when an adult patient is lying on the mattress, the first and second inflatable bladders 10, 12 are aligned beneath the sides of the patient's head and chest, while the third and fourth inflatable bladders 14, 16 are positioned beneath the sides of the patient's pelvis.

In use, a caregiver may select one of the control modes programmed into the controller 120, or optionally the caregiver may instruct the controller to perform a bespoke positioning protocol.

Once a control mode has been selected, the controller 120 automatically controls the pump and the inlet valves in the inflation manifold, so that the bladders are inflated to a desired pressure. In certain control modes, the bladders may be inflated and deflated at different times, and in different orders, in order to automatically move or reposition the patient at predetermined time intervals.

The controller 120 may be programmed to operate in one of the following control modes: lateral pressure redistribution (LPR); sleep apnea; continuous lateral rotation therapy (CLRT); or turn assist.

Figure 5:
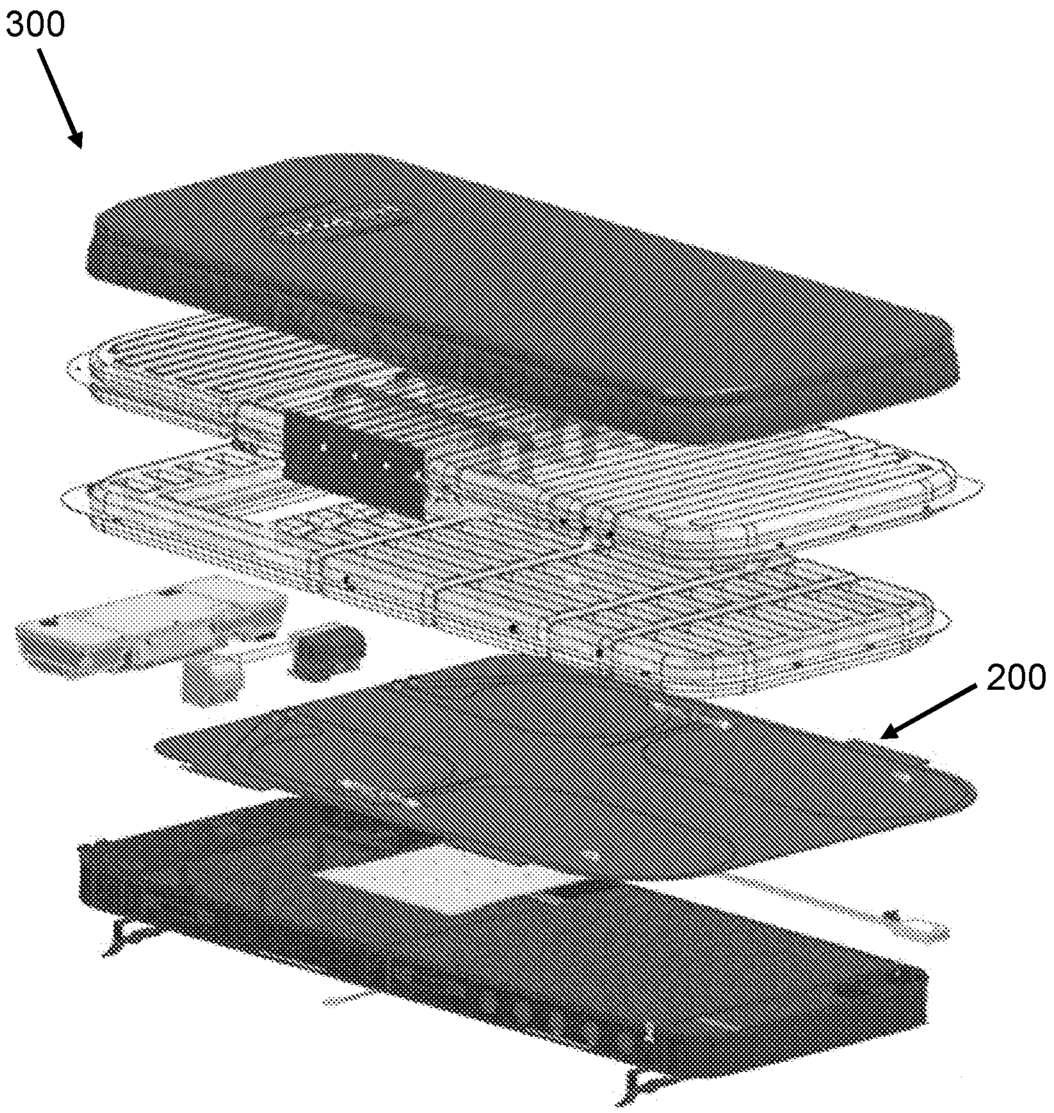
FIG. 5 shows an exploded view of a multi-layer mattress assembly according to an aspect of the invention.

FIG. 5 shows an exploded view of the patient positioning apparatus 200 in position in a mattress assembly 300. Unlike the devices of the prior art, the patient positioning apparatus is placed low down the mattress assembly, below other layers of the assembly.

This means that inflation of the bladders tilts the overlying layers of the mattress in order to reposition the patient, so that the cushioning of the mattress overlay and other mattress layers is retained between the patient and the inflated bladders at all times. This may advantageously be more comfortable for the patient than other devices in which the bladders are located at the top of the mattress assembly in order to protrude out of the upper surface when inflated.

It will be appreciated that the above described embodiments are exemplary embodiments of the invention only. It will also be appreciated that features described above in relation to one embodiment of the invention may also be applied to other embodiments of the invention.

Preferred Aspects

Preferred aspects of the invention are defined by way of example in the following numbered clauses:

Clause 1. A patient positioning apparatus for use with a mattress, the patient positioning apparatus comprising:

a first lateral tilt bladder configured to underlie a first side of the mattress, and a second lateral tilt bladder configured to underlie a second side of the mattress, in which the tilt bladders are inflatable to alter the position of a patient lying on the mattress;

in which inflation and/or deflation of the lateral tilt bladders is controllable by a controller; and in which the first and second lateral tilt bladders extend in a longitudinal direction from a waist portion towards a head end of the patient positioning apparatus and have a length of between 690 mm and 950 mm, such that the first lateral tilt bladder is configured to tilt the patient's sternum towards the second side of the mattress when inflated, and the second lateral tilt bladder is configured to tilt the patient's sternum towards the first side of the mattress when inflated.

Clause 2. A patient positioning apparatus for use with a mattress, the patient positioning apparatus comprising:

a first lateral tilt bladder configured to underlie a first side of the mattress, and a second lateral tilt bladder configured to underlie a second side of the mattress, in which the tilt bladders are inflatable to alter the position of a patient lying on the mattress; in which inflation and/or deflation of the lateral tilt bladders is controllable by a controller; and in which the first and second lateral tilt bladders extend in a longitudinal direction from a waist portion towards a head end of the patient positioning apparatus and have a length of between 750 mm and 950 mm, such that the first lateral tilt bladder is configured to tilt the patient's sternum towards the second side of the mattress when inflated, and the second lateral tilt bladder is configured to tilt the patient's sternum towards the first side of the mattress when inflated.

Clause 3. A patient positioning apparatus according to clause 1 or 2, in which the first and second lateral tilt bladders have a length of greater than or equal to 775 mm, or 800 mm, or 825 mm, or 850 mm, and less than or equal to 875 mm, or 900 mm, or 925 mm.

Clause 4. A patient positioning apparatus according to clause 1, 2 or 3, comprising a first pressure sensor configured to sense a pressure in the first lateral tilt bladder, and a second pressure sensor configured to sense a pressure in the second lateral tilt bladder, in which the controller is responsive to the first and second pressure sensors for controlling the inflation and/or deflation of the lateral tilt bladders.

Clause 5. A patient positioning apparatus according to any preceding clause, additionally comprising a third lateral tilt bladder configured to underlie the first side of the mattress, and a fourth lateral tilt bladder configured to underlie the second side of the mattress, such that the third lateral tilt bladder is configured to tilt the patient's pelvis towards the second side of the mattress when inflated, and the fourth lateral tilt bladder is configured to tilt the patient's pelvis towards the first side of the mattress when inflated.

Clause 6. A patient positioning apparatus according to clause 5 in which the third and fourth lateral tilt bladders have a length of greater than or equal to 400 mm, or 425 mm, or 450 mm, or 480 mm, and less than or equal to 500 mm, or 525 mm, or 550 mm.

Clause 7. A patient positioning apparatus according to clause 5 or 6, in which a first check valve is configured to allow fluid communication in one direction from the third lateral tilt bladder to the first lateral tilt bladder, and/or a second check valve is configured to allow fluid communication in one direction from the fourth lateral tilt bladder to the second lateral tilt bladder.

Clause 8. A patient positioning apparatus according to clause 5 or 6, comprising a third pressure sensor configured to sense a pressure in the third lateral tilt bladder, and a fourth pressure sensor configured to sense a pressure in the fourth lateral tilt bladder, in which the controller is responsive to the third and fourth pressure sensors for controlling the inflation and/or deflation of the third and fourth lateral tilt bladders.

Clause 9. A patient positioning apparatus according to any preceding clause, in which the controller is programmed to control the apparatus in a lateral pressure redistribution (LPR) mode, in which the first lateral tilt bladder is inflated to a predetermined LPR pressure before being deflated, and either the first or second lateral tilt bladder is then inflated to a predetermined LPR pressure before being deflated, so that the patient's sternum is tilted repeatedly.

Clause 10. A patient positioning apparatus according to any of clauses 5 to 9, in which the controller is programmed to control the apparatus in a Continuous Lateral Rotation Therapy (CLRT) mode in which the first and third lateral tilt bladders are inflated to a predetermined CLRT pressure, following which the first and third bladders are deflated and the second and fourth bladders are inflated to the predetermined CLRT pressure, in which the inflation cycle is repeated to continuously rotate the patient on the mattress.

Clause 11. A patient positioning apparatus according to clause 10, in which the first lateral tilt bladder is inflated to a higher pressure than the third bladder, and the second lateral tilt bladder is inflated to a higher pressure than the fourth bladder, so that the patient's torso is rotated to a greater angle than their pelvis during the CLRT cycle.

Clause 12. A patient positioning apparatus according to any of clauses 5 to 11, in which the first and third lateral tilt bladders, and the second and fourth tilt bladders, respectively, are separated by a longitudinal distance of greater than or equal to 50 mm, or 60 mm, and less than or equal to 80 mm or 100 mm.

Clause 13. A patient positioning apparatus according to any of clauses 5 to 12, in which the first and third lateral tilt bladders, and the second and fourth tilt bladders, respectively, are separated by openings formed through the apparatus.

Clause 14. A patient positioning apparatus according to any preceding clause, in which the apparatus comprises a plurality of inflation ports, each of which is in fluid communication with a respective lateral tilt bladder, and in which the inflation ports are configured to be connectable directly to the outlets of an inflation manifold.

Clause 15. A patient positioning apparatus according to clause 14, in which the inflation ports are positioned at the foot-end of the patient positioning apparatus and connected to their respective bladders by welded conduits.

Clause 16. A mattress, comprising a mattress layer and a patient positioning apparatus according to any preceding clause, in which the patient positioning apparatus is positioned beneath the mattress layer, so that inflation of the lateral tilt bladders moves the mattress layer to alter the lateral position of a patient lying on the mattress layer.

The invention claimed is:

1. A patient positioning apparatus for use with a mattress, the patient positioning apparatus comprising: a first lateral tilt bladder and a third lateral tilt bladder configured to underlie a first side of the mattress, and a second lateral tilt bladder and a fourth lateral tilt bladder configured to underlie a second side of the mattress, in which the tilt bladders are inflatable to alter a position of a patient lying on the mattress; in which a pair of sheets are welded together to form the first, second, third, and fourth lateral tilt bladders between the sheets; in which inflation and/or deflation of the lateral tilt bladders is controllable by a controller; in which the first lateral tilt bladder is configured to tilt the patient's sternum towards the second side of the mattress when inflated, the second lateral tilt bladder is configured to tilt the patient's sternum towards the first side of the mattress when inflated, the third lateral tilt bladder is configured to tilt the patient's pelvis towards the second side of the mattress when inflated, and the fourth lateral tilt bladder is configured to tilt the patient's pelvis towards the first side of the mattress when inflated, in which a first check valve is configured to allow fluid communication in one direction from the third lateral tilt bladder to the first lateral tilt bladder, and a second check valve is configured to allow fluid communication in one direction from the fourth lateral tilt bladder to the second lateral tilt bladder, in which each lateral tilt bladder is in fluid communication with a separate inflation port, and in which the first lateral tilt bladder is inflatable without inflating the third lateral tilt bladder, and the second lateral tilt bladder is inflatable without inflating the fourth lateral tilt bladder, and in which the first and third lateral tilt bladders and the second and fourth lateral tilt bladders are separated by openings formed by cuts through the pair of sheets and the cuts being surrounded by lines of radio frequency (RF) welding.

2. A patient positioning apparatus according to claim 1, in which the first and second lateral tilt bladders extend in a longitudinal direction from a waist portion towards a head end of the patient positioning apparatus and have a length of greater than or equal to 690 mm, or 700 mm, or 710 mm, or 720 mm, or 750 mm, or 775 mm, or 800 mm, or 825 mm, or 850 mm, and less than or equal to 875 mm, or 900 mm, or 925 mm, or 950 mm.

3. A patient positioning apparatus according to claim 1, in which the third and fourth lateral tilt bladders are positioned between a waist portion and a foot end of the apparatus, and have a length of greater than or equal to 400 mm, or 425 mm, or 450 mm, or 480 mm, and less than or equal to 500 mm, or 525 mm, or 550 mm.

4. A patient positioning apparatus according to claim 1, further comprising a first pressure sensor configured to sense a pressure in the first lateral tilt bladder, and a second pressure sensor configured to sense a pressure in the second lateral tilt bladder, in which the controller is responsive to the first and second pressure sensors for controlling the inflation and/or deflation of the lateral tilt bladders.

5. A patient positioning apparatus according to claim 1, in which the controller is programmed to control the apparatus in a lateral pressure redistribution (LPR) mode, in which the first lateral tilt bladder is inflated to a predetermined LPR pressure before being deflated, and either the first or second lateral tilt bladder is then inflated to a predetermined LPR pressure before being deflated, so that the patient's sternum is tilted repeatedly.

6. A patient positioning apparatus according to claim 1, in which the controller is programmed to control the apparatus in a Continuous Lateral Rotation Therapy (CLRT) mode in which the first and third lateral tilt bladders are inflated to a predetermined CLRT pressure, following which the first and third bladders are deflated and the second and fourth bladders are inflated to the predetermined CLRT pressure, in which an inflation cycle is repeated to continuously rotate the patient on the mattress.

7. A patient positioning apparatus according to claim 1, in which the first and third lateral tilt bladders, and the second and fourth tilt bladders, respectively, are separated by a longitudinal distance of greater than or equal to 50 mm, or 60 mm, and less than or equal to 80 mm or 100 mm.

8. A patient positioning apparatus according to claim 1, in which the first and third lateral tilt bladders, and the second and fourth tilt bladders, respectively, are separated by openings formed through the apparatus.

9. A patient positioning apparatus according to claim 1, in which the inflation ports are configured to be connectable directly to the outlets of an inflation manifold.

10. A patient positioning apparatus according to claim 1, in which the inflation ports are positioned at a foot-end of the patient positioning apparatus and connected to their respective first, second, third, and fourth lateral tilt bladders by welded conduits.

11. A mattress, comprising a mattress layer and the patient positioning apparatus according to claim 1, in which the patient positioning apparatus is positioned beneath the mattress layer, so that inflation of the first, second, third, and fourth lateral tilt bladders moves the mattress layer to alter a lateral position of a patient lying on the mattress layer.

12. A mattress according to claim 11, in which a waist portion of the patient positioning apparatus is positioned beneath a waist portion of the mattress layer so that the first lateral tilt bladder and the third lateral tilt bladder underlie a first side of the mattress, and the second lateral tilt bladder and the fourth lateral tilt bladder underlie a second side of the mattress, and a waist portion of the patient positioning apparatus is positioned beneath a waist portion of the mattress.

13. A mattress according to claim 11, in which the mattress layer is a mattress surface layer, or an overlay, or an upper air mattress layer.

14. A mattress system comprising a mattress according to claim 11, a pump, and an inflation manifold connectable to the first, second, third, and fourth lateral tilt bladders, in which the pump is controllable by the controller to pump fluid through the inflation manifold to inflate or deflate the first, second, third, and fourth lateral tilt bladders.

* * * * *